(12) United States Patent
Nagatani et al.

(10) Patent No.: US 9,214,654 B2
(45) Date of Patent: Dec. 15, 2015

(54) TRANSPORTION, STORAGE AND INSTALLATION RACK FOR BATTERY PACKS

(71) Applicant: NGK Insulators, Ltd., Nagoya-Shi (JP)

(72) Inventors: Yuta Nagatani, Nagoya (JP); Mikine Takeyama, Hashima-Gun (JP); Hitoshi Kamiya, Chiryu (JP)

(73) Assignee: NGK Insulators, Ltd., Nagoya (JP)

( * ) Notice: Subject to any disclaimer, the term of this patent is extended or adjusted under 35 U.S.C. 154(b) by 391 days.

(21) Appl. No.: 13/756,762

(22) Filed: Feb. 1, 2013

(65) Prior Publication Data

US 2013/0143092 A1 Jun. 6, 2013

Related U.S. Application Data

(63) Continuation of application No. PCT/JP2011/065582, filed on Jul. 7, 2011.

(30) Foreign Application Priority Data

Aug. 24, 2010 (JP) ................................. 2010-187216

(51) Int. Cl.
- *H01M 2/10* (2006.01)
- *A47F 1/00* (2006.01)
- *H01M 2/02* (2006.01)

(52) U.S. Cl.
CPC ............... *H01M 2/1016* (2013.01); *A47F 1/00* (2013.01); *H01M 2/10* (2013.01); *H01M 2/1077* (2013.01); *H01M 2/0245* (2013.01)

(58) Field of Classification Search
CPC ... H01M 2/10; H01M 2/1005; H01M 2/1016; H01M 2/1061; H01M 2/105; H01M 2/1077; H01M 2/0245; A47F 1/00
See application file for complete search history.

(56) References Cited

U.S. PATENT DOCUMENTS

| | | | |
|---|---|---|---|
| 1,355,486 | A | 10/1920 | Longenecker |
| 5,814,968 | A | 9/1998 | Lovegreen et al. |
| 6,293,400 | B1 | 9/2001 | Arai et al. |

FOREIGN PATENT DOCUMENTS

| | | |
|---|---|---|
| CN | 1238286 A | 12/1999 |
| EP | 0 575 060 A1 | 12/1993 |
| JP | 60-145550 U | 9/1985 |
| JP | 05-016051 A1 | 1/1993 |

(Continued)

OTHER PUBLICATIONS

Extended European Search Report (Application No. 11819695.5) dated Jul. 7, 2014.

(Continued)

*Primary Examiner* — Raymond Alejandro
(74) *Attorney, Agent, or Firm* — Burr & Brown, PLLC

(57) ABSTRACT

A rack for battery packs for transporting battery modules which are stored therein, and includes a bottom frame and struts located at four corners of the bottom frame. A fitting projection is formed at an upper end of each of the struts, a fitting hole into which the fitting projection is fitted is formed in a bottom part of each of the struts. When the rack is stacked one on top of another by fitting the fitting projection of each of the struts of a lower rack into the projection hole of each of the struts of an upper rack, the rack for battery pack can be used as an installation rack. Accordingly, a separate installation rack is not necessary, and returning a transportation rack is not necessary, either.

4 Claims, 6 Drawing Sheets

(56) References Cited

FOREIGN PATENT DOCUMENTS

| | | | |
|---|---|---|---|
| JP | 05-275072 A1 | 10/1993 | |
| JP | 05-275113 A1 | 10/1993 | |
| JP | 05-275114 A1 | 10/1993 | |
| JP | H08-726 U | 4/1996 | |
| JP | 11-059688 A1 | 3/1999 | |
| JP | 2000-053182 A1 | 2/2000 | |
| JP | 2000-079961 * | 3/2000 | ............. B65D 61/00 |
| JP | 2000-079961 A1 | 3/2000 | |
| JP | 2000-315521 A1 | 11/2000 | |

OTHER PUBLICATIONS

International Search Report dated Oct. 18, 2011 (with English translation).

Chinese Office Action (With English Translation), Chinese Application No. 201180038084.2, dated May 12, 2015 (10 pages).

* cited by examiner

TRANSPORTION, STORAGE AND INSTALLATION RACK FOR BATTERY PACKS

BACKGROUND OF THE INVENTION

1. Field of the Invention

The present invention relates to a rack for battery packs used for transporting, storing in a warehouse, or installing NaS batteries or other battery packs.

2. Description of Related Art

A battery pack such as a NaS battery, a lithium-ion battery, or a Ni—$H_2$ battery is formed as a battery module by densely arranging a plurality of unit cells in a case. Examples thereof are described in Patent Documents 1 and 2, and the like. Although there is a case where such a battery module is used alone, there are many other cases where a plurality of battery modules is combined together for storing a large amount of power.

Patent Document 3 describes an example in which battery modules are stored inside a container provided with shelf boards so that the battery modules can be pulled out. However, an actual facility for storing a large amount of power is a large facility that uses several dozens of battery modules. For this reason, when such a facility is newly built, a steel-framed installation rack capable of storing therein several dozens of battery modules is installed at an installation site, and the battery modules transported from a factory are set inside the installation rack one by one using a dedicated tool provided with a hoisting and push-in function. However, since such a dedicated tool is not necessary after completion of the installation, it causes a waste in the cost. Further, constructing the installation rack requires many days and much cost.

Further, since the battery modules are heavy, they are shipped from the factory in a state of being stored with cushioning materials in a steel-framed transportation rack. Since the NaS batteries are often exported overseas, the transportation rack having a sufficient strength to avoid troubles during transportation is used. However, such a transportation rack becomes unnecessary after installing the battery modules in the installation rack, and this involves a lot of cost regardless of whether it is scrapped locally or it is sent back to Japan.

RELATED ART DOCUMENTS

Patent Literatures

Patent Document 1: JP 1993-275072 A
Patent Document 2: JP 1993-275113 A
Patent Document 3: JP 1993-275114 A

SUMMARY OF THE INVENTION

Problem to be Solved by the Invention

It is an object of the present invention to provide a rack for battery packs which can solve the foregoing conventional problem, reduce a cost necessary for producing an installation rack, reduce a cost incurred in scrapping or returning a transportation rack, and further make possible installation without using a dedicated tool for hoisting and pushing battery modules as in the conventional case.

Means for Solving the Problem

According to a first aspect of the present invention to solve the foregoing problem, a rack includes a bottom frame and struts erected at four corners of the bottom frame, and is used for transporting battery modules stored therein. In the rack, a fitting projection is formed at an upper end of each of the struts and a fitting hole into which the fitting projection is fitted is formed in a bottom part of each of the struts. The rack can be used as an installation rack when stacked one on top of another by fitting the fitting projection of each of the struts of a lower rack into the projection hole of each of the struts of an upper rack.

It is preferable, according to a second aspect of the present invention, that an upper portion of the fitting projection be tapered.

It is preferable, according to a third aspect of the present invention, that a plate-like member for load distribution be arranged between lower ends of the struts that make a pair. It is preferable, according to a fourth aspect of the present invention, that the plate-like member have a U-shaped cross section with rounded bottom corners thereof.

Further, it is preferable, according to a fifth aspect of the present invention, that a spacer inserted between each of the struts of the lower rack and each of the struts of the upper rack be provided during transportation or during storage in a warehouse.

Effect of the Invention

The racks for battery packs according to the present invention can be used as the installation racks by stacking up the transportation racks as they are. Therefore, there is no need to install separate installation racks in advance as in the conventional case. Accordingly, it is possible to reduce the manufacturing cost of the installation racks and also to shorten the construction period. In addition, scrapping or returning the transportation racks is not necessary, and therefore the cost incurred in this respect can be also reduced. Furthermore, since the racks for battery packs can be stacked up by using a forklift, the dedicated tool as required in the conventional case is not necessary.

According to the second aspect of the present invention, by arranging the upper part of the fitting projection in a tapered shape, even if the lower rack and the upper rack slightly deviate from each other, it is easy to fit the fitting projection of the strut of the lower rack into the fitting hole of the strut of the upper rack, and stacking is made possible by positioning the racks.

According to the third aspect of the present invention, by disposing the plate-like member for load distribution between the lower ends of the struts that make a pair, the wooden floor of the container is not damaged during transportation according to the fourth aspect of the present invention, by arranging the plate-like member to have a U-shaped cross section with rounded bottom corners thereof, the rack tends to slip when pushed into the container or pulled out of the container.

Further, since cushioning members are used when the battery modules are transported or stored in a warehouse, it is necessary to increase a vertical distance between the battery modules than in the case of installation. A height can be adjusted by using the spacer according to the fifth aspect of the present invention. This spacer can be removed during installation.

DETAILED DESCRIPTION OF THE INVENTION

Hereinafter, an embodiment of the present invention will be described with reference to the drawings.

Figure 1:
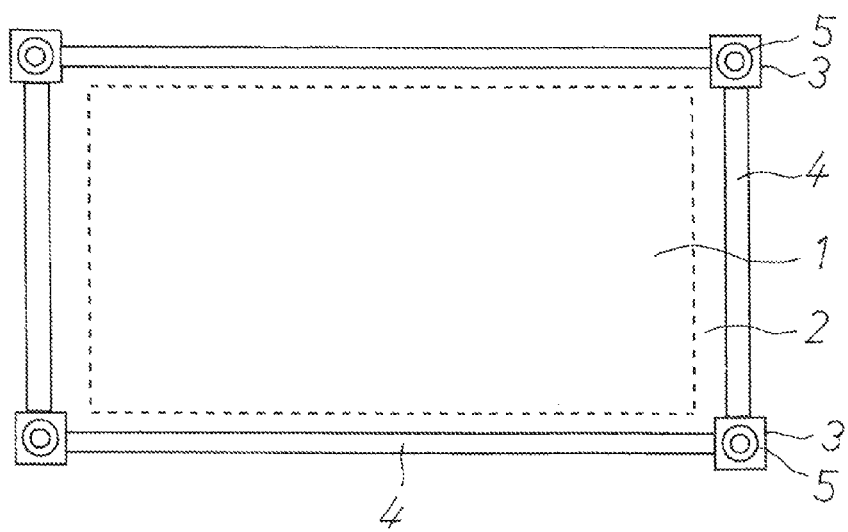
FIG. 1 is a plan view illustrating an embodiment of the present invention.
Figure 2:
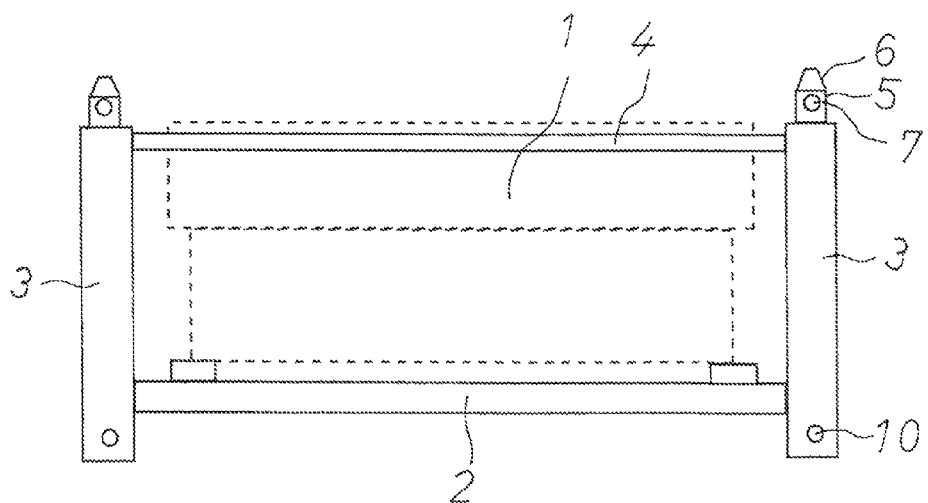
FIG. 2 is a front view illustrating the embodiment of the present invention.

As illustrated in FIGS. 1 and 2, a rack for battery packs according to the present invention is a steel rack for storing therein a battery module 1, and is provided with struts 3 at four corners of a bottom frame 2 that supports the battery module 1. The battery module 1 in this embodiment is a NaS battery, but may be a battery pack of a lithium-ion battery, a Ni—$H_2$ battery, or the like as described earlier. The battery module 1 has a rectangular parallelepiped case storing therein several hundred unit cells and hence is heavy. Reference numeral 4 represents a coupling member for connecting between upper parts of the struts 3, an arrangement thereof is free, and a diagonal coupling member such as a brace may be added. The battery module 1 is transported in a state of being stored in such a rack for battery packs.

Figure 3:
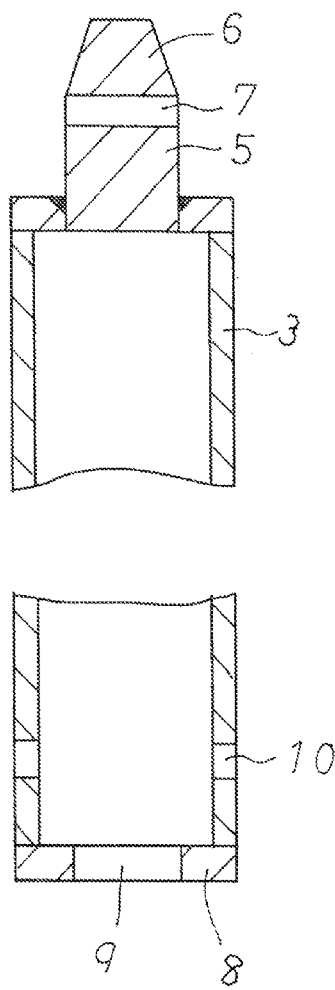
FIG. 3 is a cross sectional view of a strut.

The strut 3 of the rack for battery packs according to the present invention is formed of a square steel pipe having a substantially square shape in cross section as illustrated in FIG. 3, a fitting projection 5 is provided at an upper end of each of the struts 3 in a protruding manner. The fitting projection 5 has a structure in which an upper part of a circular cylinder is arranged as a tapered portion 6, and a transverse hole 7 penetrates therethrough. The fitting projection 5 is welded to the upper end of the strut 3. Further, a fitting hole 9 into which the fitting projection 5 is fitted is formed in a bottom plate 8 welded to a bottom part of each of the struts 3. Also, a transverse hole 10 is formed in the vicinity of a lower end of the strut 3.

Figure 4:
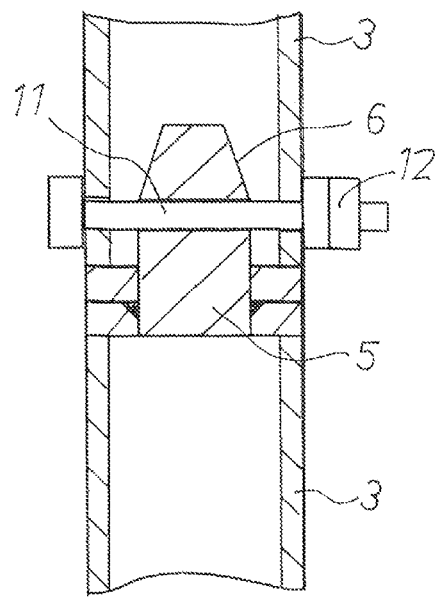
FIG. 4 is a cross sectional view illustrating a coupling state.
Figure 5:
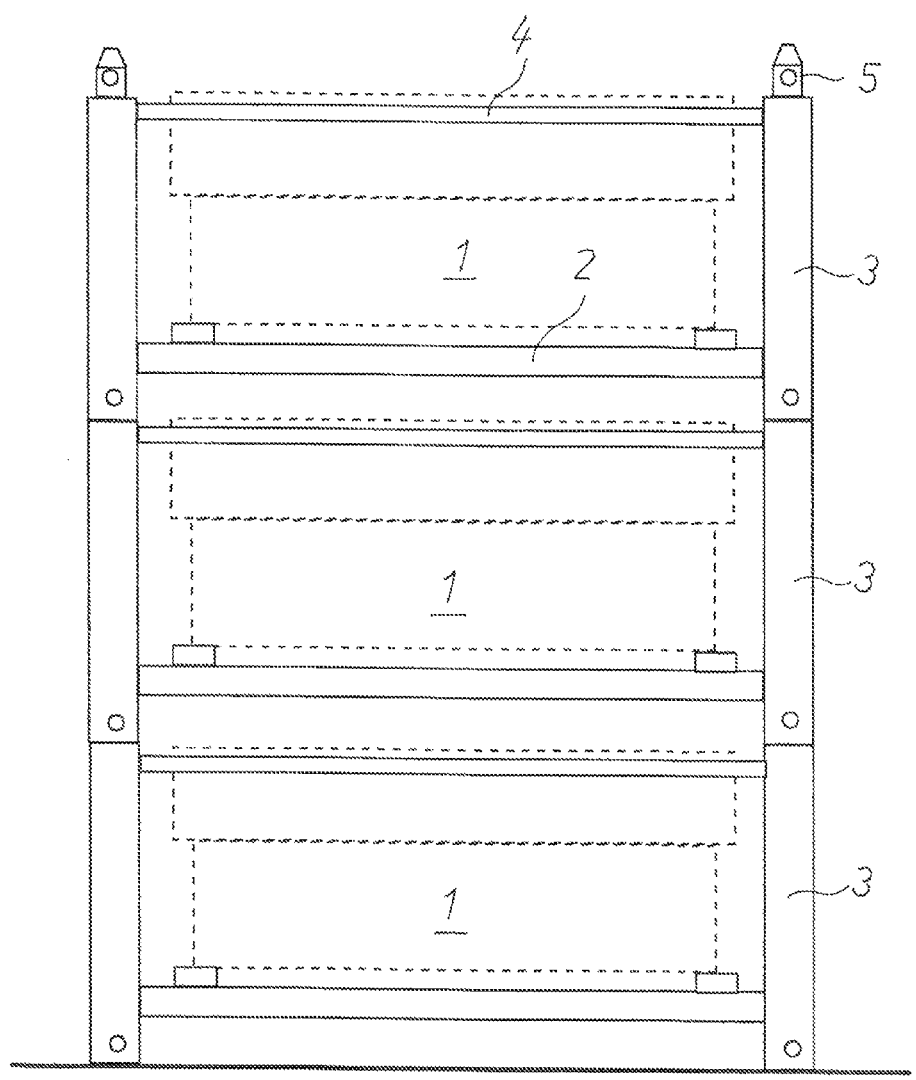
FIG. 5 is a front view illustrating a stacking state.

Since the rack for battery packs according to the present invention has the struts 3 having the structure as described above, the racks for battery packs can be stacked up together by stacking the racks for battery packs vertically, and fitting the fitting projection 5 of the strut 3 of a lower rack into the fitting hole 9 of the strut 3 of an upper rack, as illustrated in FIG. 4. This kind of stacking can be made by lifting the rack for battery pack while the battery modules 1 are stored therein by a forklift, and does not require a dedicated tool as used in the conventional case. FIG. 5 illustrates a state of a three-tier stacking. However, the number of tiers can be arbitrarily increased or decreased.

For this, by arranging the upper part of the fitting projection 5 as the tapered portion 6, even if the lower rack and the upper rack slightly deviate from each other, it becomes easier to fit the fitting projection 5 of the strut 3 of the lower rack into the fitting hole 9 of the strut 3 of the upper rack. Further, stacking is made possible by positioning the upper and lower racks while the tapered portion 6 serves as a guide portion. Thereafter, as illustrated in FIG. 4, a bolt 11 is inserted into the transverse hole 7 of the fitting projection 5 and the transverse hole 10 at the lower end of the strut 3, and is fixed by a nut 12. Then, a firm stacking without concern about dropping is made possible, and the installation is completed in this state. Although this is not illustrated in FIG. 5, it is also possible to closely arrange the racks for battery packs according to the present invention continuously in a horizontal direction.

As described above, the racks for battery packs according to the present invention use the transportation racks as installation racks by stacking up the transportation racks as they are. For this reason, there is no need to install separate installation racks in advance as in the conventional case. Accordingly, it is possible to reduce the manufacturing cost of the installation racks and also to shorten the construction period. In addition, conventionally, the transportation racks which are no longer necessary after removing the battery modules 1 are scrapped locally or sent back. However, according to the present invention, such a process is not necessary, and the cost incurred in this respect can be reduced. Further, since the racks for battery packs according to the present invention can be stacked up by using a forklift, the dedicated tool for mounting as required in the conventional case is not necessary, which contributes to further cost reduction.

As described above, the racks for battery packs of the present invention are used as transportation racks and as installation racks, and a container is used during transportation by ship. Since the floor of the container is made of wood, if the rack has a structure in which the four struts 3 jut out downwardly, a load concentrates thereto, and the floor surface tends to be damaged. Further, when the racks are carried into or out of the long container, the racks for battery packs are pushed in or pulled out by a forklift. However, the struts 3 dig into the floor surface, and therefore such a work may not be smoothly carried out.

Figure 6:
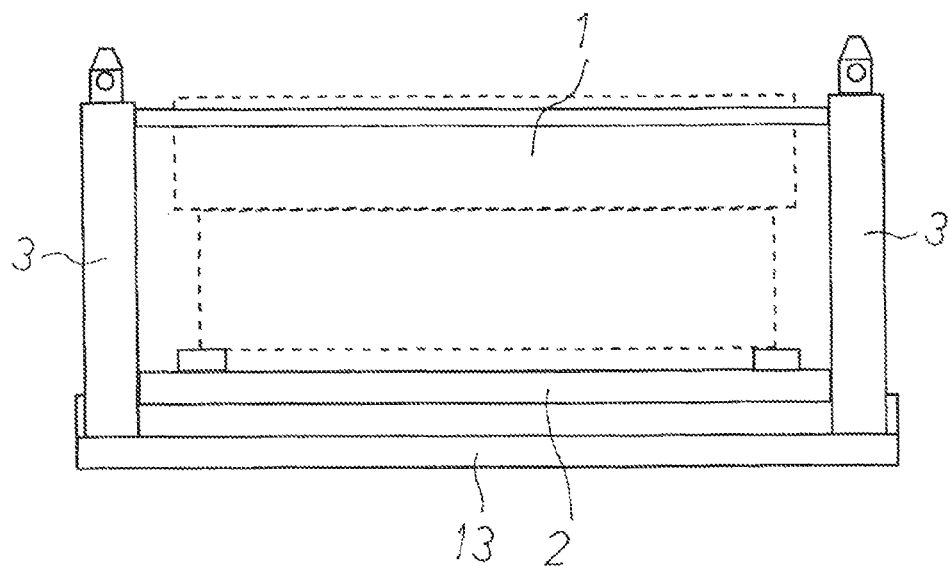
FIG. 6 is a front view of a plate-like member for load distribution.
Figure 7:
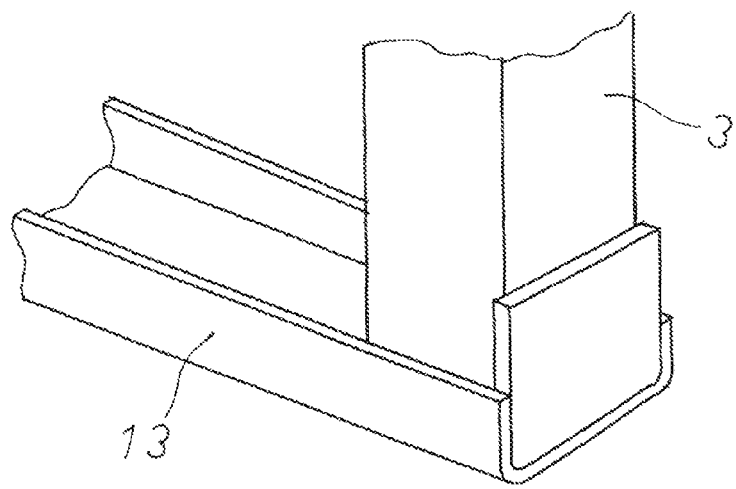
FIG. 7 is a perspective view of the plate-like member for load distribution.

In view of this, as illustrated in FIGS. 6 and 7, it is preferable to arrange a plate-like member 13 for load distribution between lower ends of the struts 3 which make a pair (front and rear struts, or right and left struts). In this embodiment, a steel stock having a U-shaped cross section is fixed between the right and left struts 3 with bolts. It is also preferable that bottom corners thereof be rounded. When such a plate-like member 13 is used, the wooden floor of the container is not damaged during transportation, and the racks do not dig into the wooden floor when the racks are pushed in or pulled out.

The plate-like member 13 is useful during transportation, but is not always necessary during installation. Accordingly, it is possible to remove the plate-like member 13 prior to the installation. However, if a fitting hole which is the same as the fitting hole 9 is provided therein, it is possible to install the racks in a state where the plate-like member 13 is fitted thereto.

Figure 8:
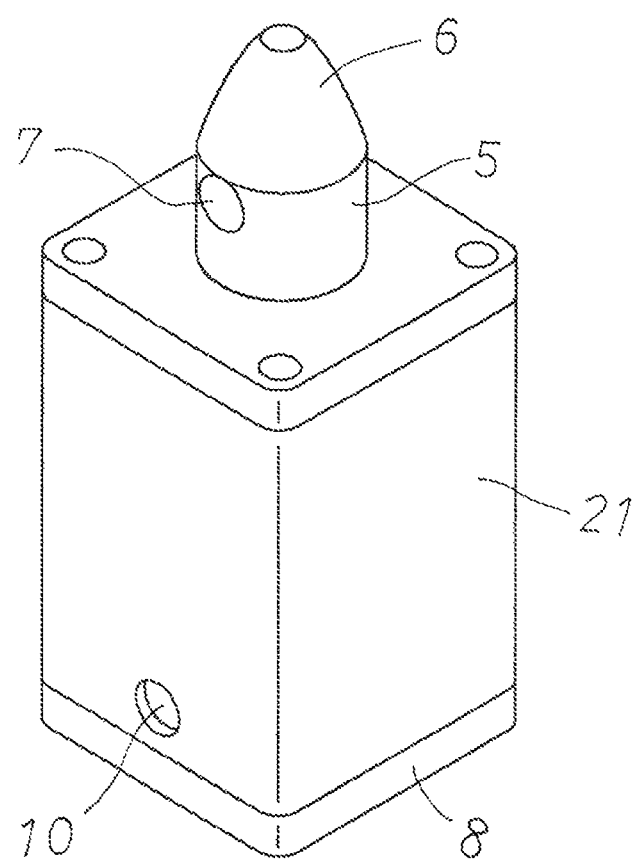
FIG. 8 is a perspective view of a spacer.
Figure 9:
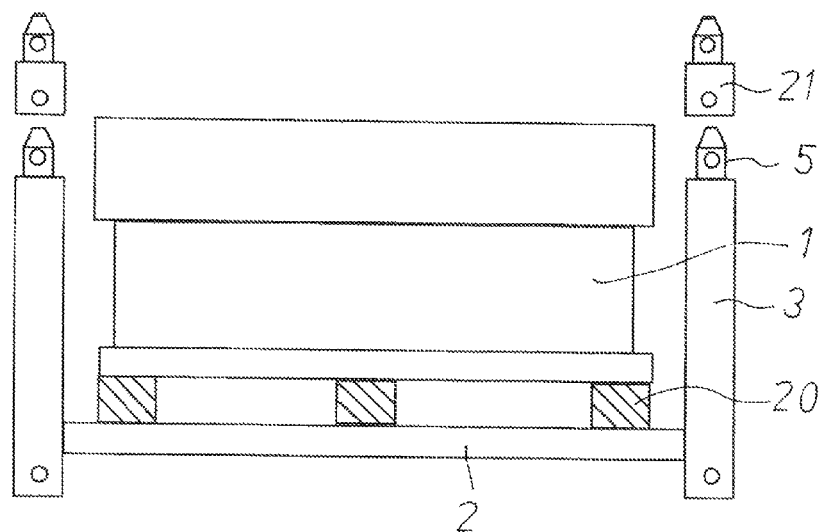
FIG. 9 is a descriptive diagram illustrating attachment of the spacer.
Figure 10:
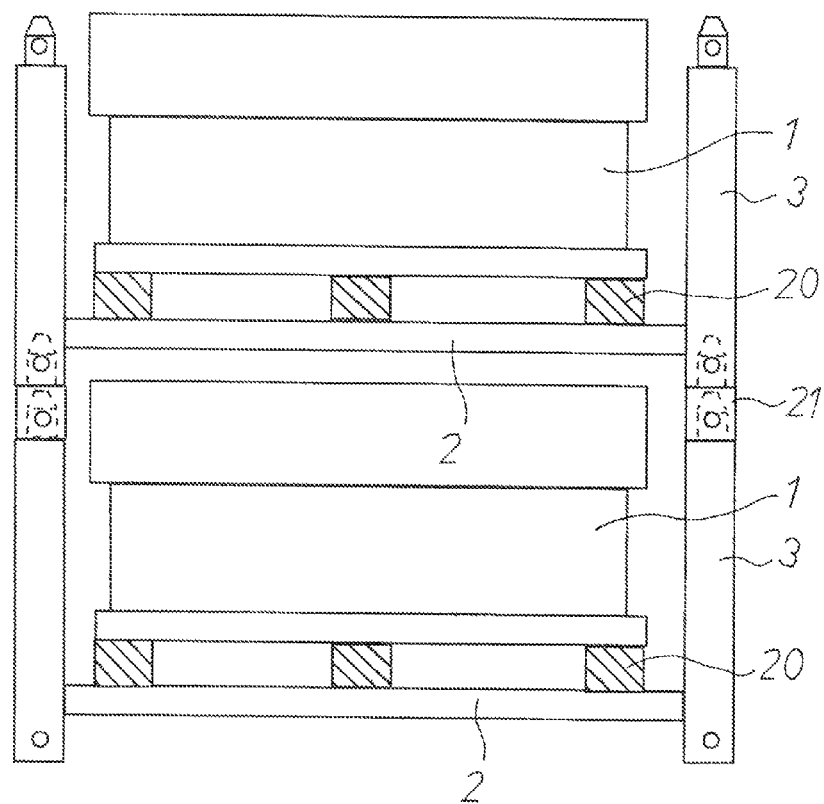
FIG. 10 is a front view illustrating a state during transportation or storage in a warehouse.

As illustrated in FIG. 10, during transportation and storage in the warehouse, cushioning materials 20 are sandwiched between the upper and lower battery modules 1 to prevent damage. However, the battery module 1 is raised by an amount of the cushioning material 20, and may interfere with the bottom frame 2 of the upper rack. In addition, the cushioning materials 20 are removed during installation. Therefore, during transportation and storage in the warehouse, it is preferable that a spacer 21 illustrated in FIGS. 8 and 9 be inserted between the strut 3 of the lower rack and the strut 3 of the upper rack to thereby increase a distance between the upper and lower racks, and the spacer 21 be removed during installation to thereby restore the original distance between the upper and lower racks.

The spacer 21 has a structure in which the fitting projection 5 is provided at an upper end thereof as in the case of the strut 3 described earlier, the fitting hole 9 is provided in the bottom plate 8, and a height thereof corresponds to a height of the cushioning material 20. Accordingly, by fitting the fitting projection 5 of the strut 3 of the lower rack into the fitting hole 9 of the spacer 21, and fitting the fitting projection 5 of the spacer 21 into the fitting hole 9 of the strut 3 of the upper rack, it is possible to increase the distance between the upper and lower racks by an amount corresponding to the height of the cushioning material 20.

REFERENCE MARKS IN THE DRAWINGS

1 Battery module
2 Bottom frame
3 Strut
4 Coupling member
5 Fitting projection
6 Tapered portion
7 Transverse hole
8 Bottom plate
9 Fitting hole
10 Transverse hole
11 Bolt
12 Nut
13 Plate-like member
20 Cushioning material
21 Spacer

The invention claimed is:
1. A rack for battery pack comprising:
struts erected at four corners of a bottom frame, the rack storing therein battery modules to be transported,
wherein a fitting projection is formed at an upper end of each of the struts and a fitting hole is formed at a lower end of each of the struts;
during transportation or storage in a warehouse, the rack for battery pack is stacked one on top of another by inserting a spacer, having a structure in which a fitting projection is formed at an upper end and a fitting hole is formed in a bottom plate thereof, between the fitting projection at the upper end of each of the struts of a lower rack and the fitting hole of each of the struts of an upper rack;
during installation, the spacer is removed, and the rack for battery pack can be used as an installation rack; and
the rack for battery pack includes a cushioning material that is sandwiched between upper and lower battery modules during transportation or storage in the warehouse, and is removed during installation, with the spacer having a height corresponding to a thickness of the cushioning material sandwiched between the upper and lower battery modules, when inserted between each of the struts of the lower rack and each of the struts of the upper rack.
2. The rack for battery pack according to claim 1, wherein an upper portion of the fitting projection is tapered.
3. The rack for battery pack according to claim 1,
wherein a plate member for load distribution is arranged between lower ends of the struts that make a pair.
4. The rack for battery pack according to claim 3,
wherein the plate member has a U-shaped cross section with rounded bottom corners thereof.

* * * * *